United States Patent
Harber

(10) Patent No.: US 9,218,004 B2
(45) Date of Patent: Dec. 22, 2015

(54) FLIGHT PATH CONTROL SYSTEM FOR AIRCRAFT

(75) Inventor: Benjamin A. Harber, Costa Mesa, CA (US)

(73) Assignee: THE BOEING COMPANY, Chicago, IL (US)

(*) Notice: Subject to any disclaimer, the term of this patent is extended or adjusted under 35 U.S.C. 154(b) by 629 days.

(21) Appl. No.: 13/076,739

(22) Filed: Mar. 31, 2011

(65) Prior Publication Data

US 2012/0248258 A1    Oct. 4, 2012

(51) Int. Cl.
*G05D 1/10* (2006.01)
*B64D 17/34* (2006.01)
*G01M 1/12* (2006.01)

(52) U.S. Cl.
CPC ............. *G05D 1/105* (2013.01); *B64D 17/34* (2013.01); *G01M 1/127* (2013.01)

(58) Field of Classification Search
CPC ........ G05D 1/105; B64D 17/34; B64D 17/30; G01M 1/127
USPC ...................... 244/35 R, 138 R, 142, 149, 152
See application file for complete search history.

(56) References Cited

U.S. PATENT DOCUMENTS

| | | | | |
|---|---|---|---|---|
| 3,433,441 A | * | 3/1969 | Cummings | ............... 244/138 R |
| 3,773,284 A | * | 11/1973 | Matsuo et al. | ................. 244/142 |
| 5,678,788 A | * | 10/1997 | Hetzer et al. | ................... 244/152 |
| 6,131,856 A | * | 10/2000 | Brown | ........................... 244/152 |
| 6,505,793 B2 | * | 1/2003 | Schwarzler | ................... 244/142 |
| 6,758,442 B2 | | 7/2004 | Bailey | |
| 6,889,942 B2 | | 5/2005 | Preston | |
| 6,962,308 B2 | * | 11/2005 | Schwaerzler et al. | ......... 244/149 |
| 7,059,570 B2 | | 6/2006 | Strong | |
| 2010/0096490 A1 | | 4/2010 | Gordon | |

FOREIGN PATENT DOCUMENTS

WO    WO0158756 A2    8/2001

OTHER PUBLICATIONS

"MMIST—The Leader in Precision Aerial Delivery—Product-Overview", http://www.mmist.ca/pg_ProductOverview.php, 1 page, retrieved Feb. 3, 2011.
EP search report dated Oct. 22, 2013 regarding application 12162648.5-1802/2506109, reference P54077EP/RGH, applicant The Boeing Company, 5 pages.
"MMIST CQ-10 Snowgoose," Wikipedia, 3 pages, Jun. 2013, accessed Dec. 5, 2013, http://en.wikipedia.org/wiki/CQ-10_Snowgoose.
"Hang Gliding," Wikipedia, Nov. 2013, 12 pages, accessed Dec. 5, 2013, http://en.wikipedia.org/wiki/Hang_gliding.
"Powered Parachute," Wikipedia, Nov. 2013, 5 pages, accessed Dec. 5, 2013, http://en.wikipedia.org/wiki/Powered_parachute.

(Continued)

*Primary Examiner* — Valentina Xavier
(74) *Attorney, Agent, or Firm* — Yee & Associates, P.C.

(57) ABSTRACT

A method and apparatus for changing a flight path of an air platform. A change for the flight path of the air platform is identified. A weight system associated with the air platform is moved during flight of the air platform such that a center of mass of the air platform changes in a manner that causes the flight path of the air platform to change.

18 Claims, 15 Drawing Sheets

(56) References Cited

OTHER PUBLICATIONS

"Powered Paragliding," Wikipedia, Sep. 2013, 6 pages, accessed Dec. 5, 2013 http://en.wikipedia.org/wiki/Powered_paragliding.

"The Future of Parachute Technology," Atair Aerospace, Copyright 2012 Atair Aerospace, Inc., 1 page, accessed Dec. 5, 2013, http://www.atair.com.

EP Search Report dated Feb. 6, 2014, regarding Application No. 12162648.5, 8 pages.

* cited by examiner

FLIGHT PATH CONTROL SYSTEM FOR AIRCRAFT

BACKGROUND INFORMATION

1. Field

The present disclosure relates generally to aircraft and, in particular, to a method and apparatus for controlling an aircraft. Still more particularly, the present disclosure relates to a method and apparatus for controlling the flight path of an aircraft.

2. Background

A parafoil is a non-rigid airfoil. A parafoil typically has cell structures inflated by air moving across the parafoil. The air causes the parafoil to have a shape, such as a cross-section of a wing. A parafoil is typically attached to an object. For example, a parafoil may be attached to an aircraft, a vehicle, or some other suitable type of object.

Parafoils may be used in performing a number of activities, such as, for example, cargo drops. For example, a number of components may be used with a parafoil to deliver a payload to a location. These components may include, for example, electric motor actuators, a computer, navigation control software, a global positioning system, and/or other suitable types of components. These components, along with the parafoil, may be referred to as an air platform.

An air platform may have electric motor actuators connected to a parafoil by lines. The electric motor actuators may be attached to a structure on which a payload is located or may be directly attached to the payload. These electric motor actuators may be controlled by a computer, navigation control software, and/or a global positioning system to control the flight path of the payload towards a target location.

The weight of these components, along with the weight of the payload, may affect the amount of time and the distance that the air platform can travel with the payload. Depending on the use, the weight may be greater than desired. The weight of the air platform may cause undesirable constraints on the size and design of the parafoil, as well as the other components for the air platform.

Thus, it would be advantageous to have a method and apparatus that takes into account at least some of the issues discussed above, as well as other possible issues.

SUMMARY

In one advantageous embodiment, an apparatus comprises a weight system associated with an air platform and a movement mechanism associated with the air platform. The movement mechanism is configured to move the weight system during a flight of the air platform such that a center of mass of the air platform changes in a manner that causes a flight path of the air platform to change.

In another advantageous embodiment, a parafoil system comprises a parafoil, a plurality of lines, and a movement mechanism. The plurality of lines is configured to connect a payload to the parafoil. The movement mechanism is connected to the payload and configured to move at least one of the plurality of lines connecting the payload to the parafoil such that the payload moves relative to the parafoil. A center of mass of the parafoil system relative to a center of lift for the parafoil changes by an amount sufficient to change a flight path of the parafoil with the payload.

In yet another advantageous embodiment, a method is provided for changing a flight path of an air platform. A change for the flight path of the air platform is identified. A weight system associated with the air platform is moved during flight of the air platform such that a center of mass of the air platform changes in a manner that causes the flight path of the air platform to change.

The features, functions, and advantages can be achieved independently in various advantageous embodiments of the present disclosure or may be combined in yet other advantageous embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The invention is described below with reference to certain examples or embodiments as shown in the accompanying drawings. These examples or embodiments are not limiting, but rather are merely exemplary of some of the ways in which the invention may be reduced to practice.

Figure 1:
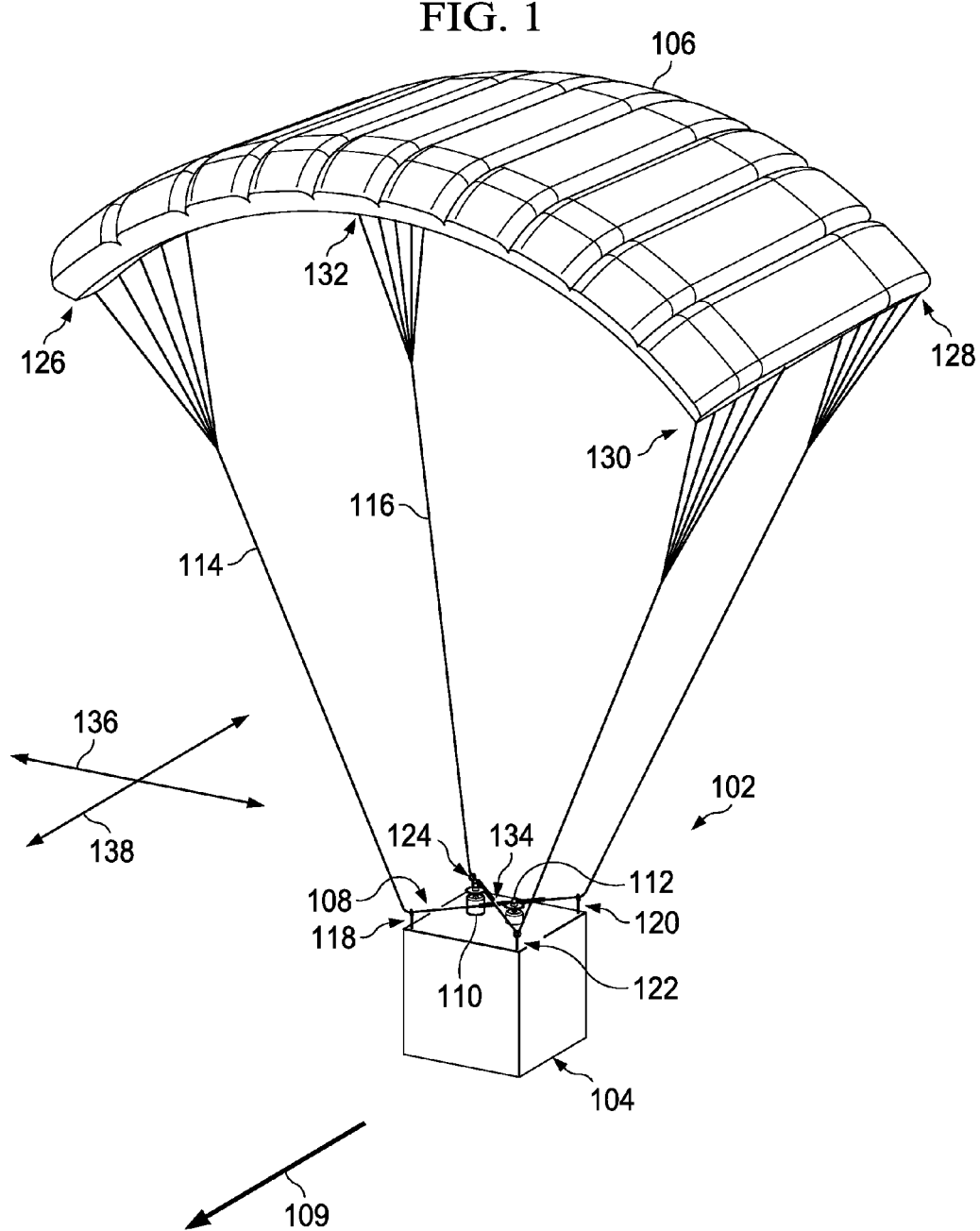
FIG. 1 is an illustration of an air platform in accordance with an advantageous embodiment.

FIG. 1 illustrates one embodiment of an air platform 102. For convenience and ease of comprehension, the air platform referenced in the text and figures of the present disclosure may be a paraglider or a fixed-wing vehicle and, as such, these terms may be used interchangeably. However, it should be noted that other manned or unmanned, powered or unpowered, air vehicles including, but not limited to, a paraglider, a parachute, a glider, a fixed-wing vehicle, a parafoil connected to a payload, a hang glider, a parafoil wing, and a fixed-wing unmanned aerial vehicle, are also within the scope of the claimed invention.

As shown in FIG. 1, the air platform 102 includes a payload 104, an airfoil 106, and a movement mechanism 108. The payload 104 may include, but is not limited to, cargo, goods, produce, people, containers, a fixed-wing vehicle, vehicles, and/or any other items that are transported from one location to another location. The airfoil 106 is a type of wing for the air platform 102. This type of airfoil 106 may also be referred to as a parafoil.

In general, the movement mechanism 108 is configured to change the center of mass of the air platform 102 with respect to the center of lift for the air platform 102 to control a flight path 109 of the air platform 102. The center of mass for the air platform 102 is defined as the mean location of all the mass for the air platform 102. Further, the center of lift for the air platform 102 is defined as the mean location at which all of the lifting forces for the air platform 102 act.

Figure 2:
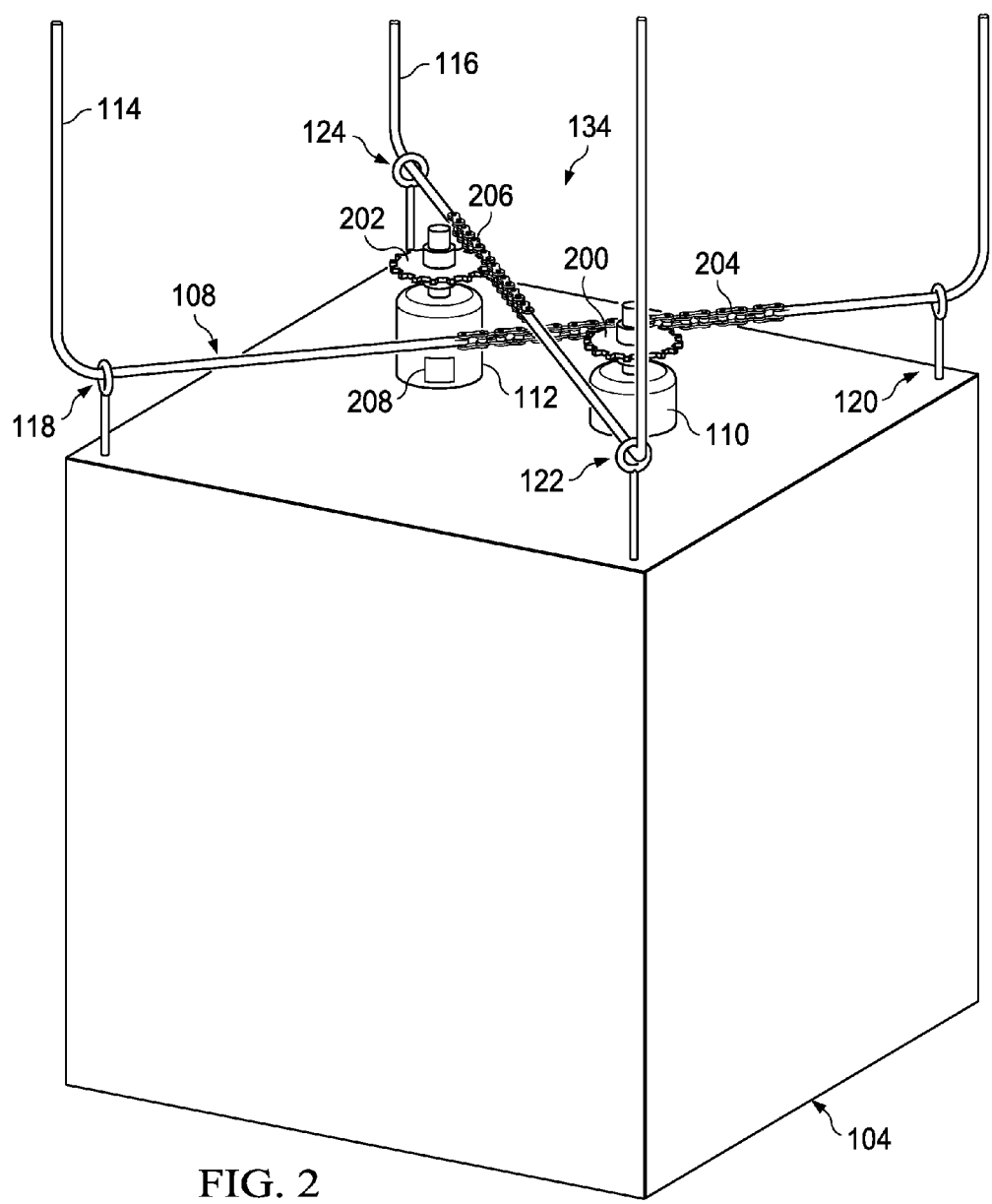
FIG. 2 is an illustration of a more-detailed view of a movement mechanism connected to a payload in accordance with an advantageous embodiment.

As shown in FIGS. 1 and 2, a movement mechanism 116 comprises one or more motors 110, 112 configured to engage one or more lines 114, 116 connecting the payload 104 to the airfoil 106. The motors 110, 112 are connected to the payload 104. The lines 114, 116 may be connected to the payload 104 via members 118, 120, 122, 124 that are attached to the payload 104.

Various types of members 118, 120, 122, 124 may be used including, but not limited to, eyelets, eyelet screws, pulleys, sprockets, gears, wheels, and/or any other type of component that allows the lines to effortlessly pass through the members. In one advantageous embodiment, each line 114, 116 is threaded through two of the members 118, 120, 122, 124 in the form of eyelets that are at opposite and diagonal locations on the payload 104.

Ends 126, 128, 130, 132 of each line 114, 116 are connected to a portion of the airfoil 106. In one embodiment, the ends 126, 128 of a line 114 may be connected to the airfoil 106 at first and second locations, respectively, that are opposite and diagonal to each other. Similarly, the ends 130, 132 of the other line 116 may also be connected to the airfoil 106 at third and fourth locations, respectively, that are opposite and diagonal to each other.

With this type of configuration, the lines 114, 116 passing through the members 118, 120, 122, 124 connected to the payload 104 form an X-shape 134 over the payload 104.

The motors 110, 112 include one or more gears 200, 202 that engage one or more chain sections 204, 206, of the lines 114, 116. In particular, the teeth of the gears 200, 202 mesh with the holes in the links of the chains 204, 206 such that rotation of the gears 200, 202 by the motors 110, 112 causes movement of the payload 104.

For example, rotation of the gears 200, 202 causes the payload 104 connected to the movement mechanism 108 to move relative to the lines 114, 116 and thereby the airfoil 106. In one illustrative example, rotation of the gears 200, 202 moves the lines 114, 116 to move the payload 104 relative to the airfoil 106. For example, while the gear 200 is engaged with the chain 204 for the line 114, rotation of the gear 200 moves the line 114. The movement of the line 114 moves the payload 104 relative to the airfoil 106.

The movement of the payload 104 relative to the airfoil 106 changes the center of mass for the air platform 102 relative to the center of lift for the air platform 102 such that the flight path 109 of the air platform 102 may be changed with respect to a pitch axis 136 and/or a roll axis 138 for the air platform 102. In other words, movement of the payload 104 relative to the airfoil 106 may change the flight path 109 for the air platform 102.

In some cases, movement of the payload 104 in response to the motors 110, 112 turning the gears 200, 202 may also cause movement of the airfoil 106. For example, movement of the payload 104 may cause movement of the lines 114, 116 such that a shape of the airfoil 106 is changed. This change may be the airfoil 106 bending, deforming, or changing in some other manner. In some cases, the change may be different portions of the airfoil 106 being moved in one or more directions.

The motors 110, 112 may be controlled by a controller 208 connected to one or more of the motors 110, 112. The controller 208 may be, for example, a computer, an integrated circuit, an application-specific integrated circuit, a processor unit, a microprocessor, and/or some other suitable type of controller. The controller 208 determines when the payload 104 is to be moved and activates the motors 110, 112 to move the payload 104 accordingly.

The following examples illustrate how the center of mass is changed relative to the center of lift for the air platform 102. FIG. 1 illustrates the general flight path 109 of the air platform 102.

Figure 3:
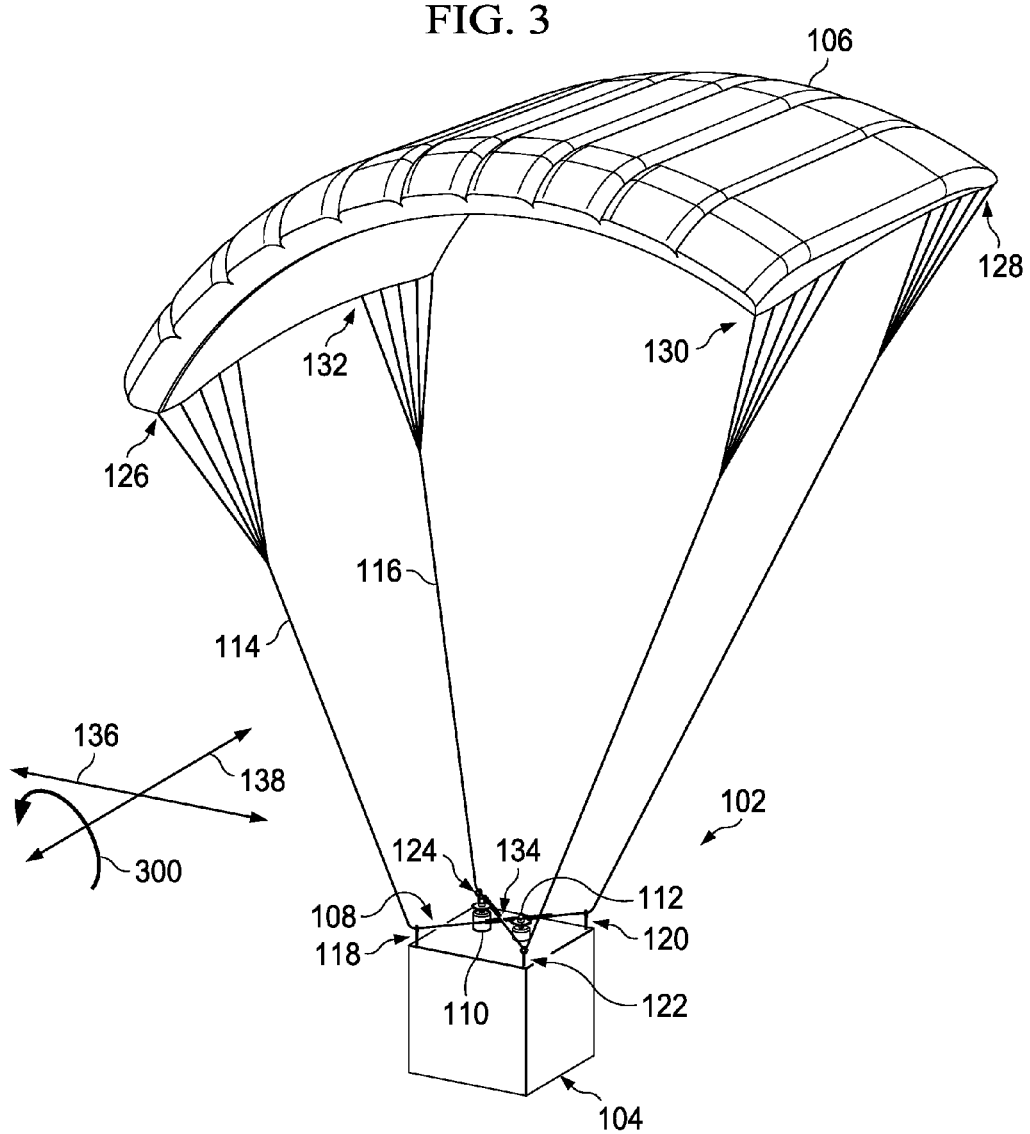
FIG. 3 is an illustration of an air platform in accordance with an advantageous embodiment.

To change the flight path 109, the position of the payload 104 relative to the airfoil 106 is changed, as shown in FIG. 3. In particular, in FIG. 3, rotation of the gears 200, 202 by the motors 110, 112 causes movement of the payload 104 relative to the lines 114, 116 and the airfoil 106. The weight of the payload 104 may also cause the airfoil 106 to move when the payload 104 is moved relative to the lines 114, 116. The payload 104 is moved relative to the airfoil 106 such that the first and third locations of the airfoil 106 are closer to the payload 104, while the second and fourth locations of the airfoil 106 are further away from the payload 104. This, in turn, changes the center of mass of the air platform 102 relative to its center of lift such that the air platform 102 is steered in the direction of an arrow 300 with respect to the roll axis 138.

Figure 4:
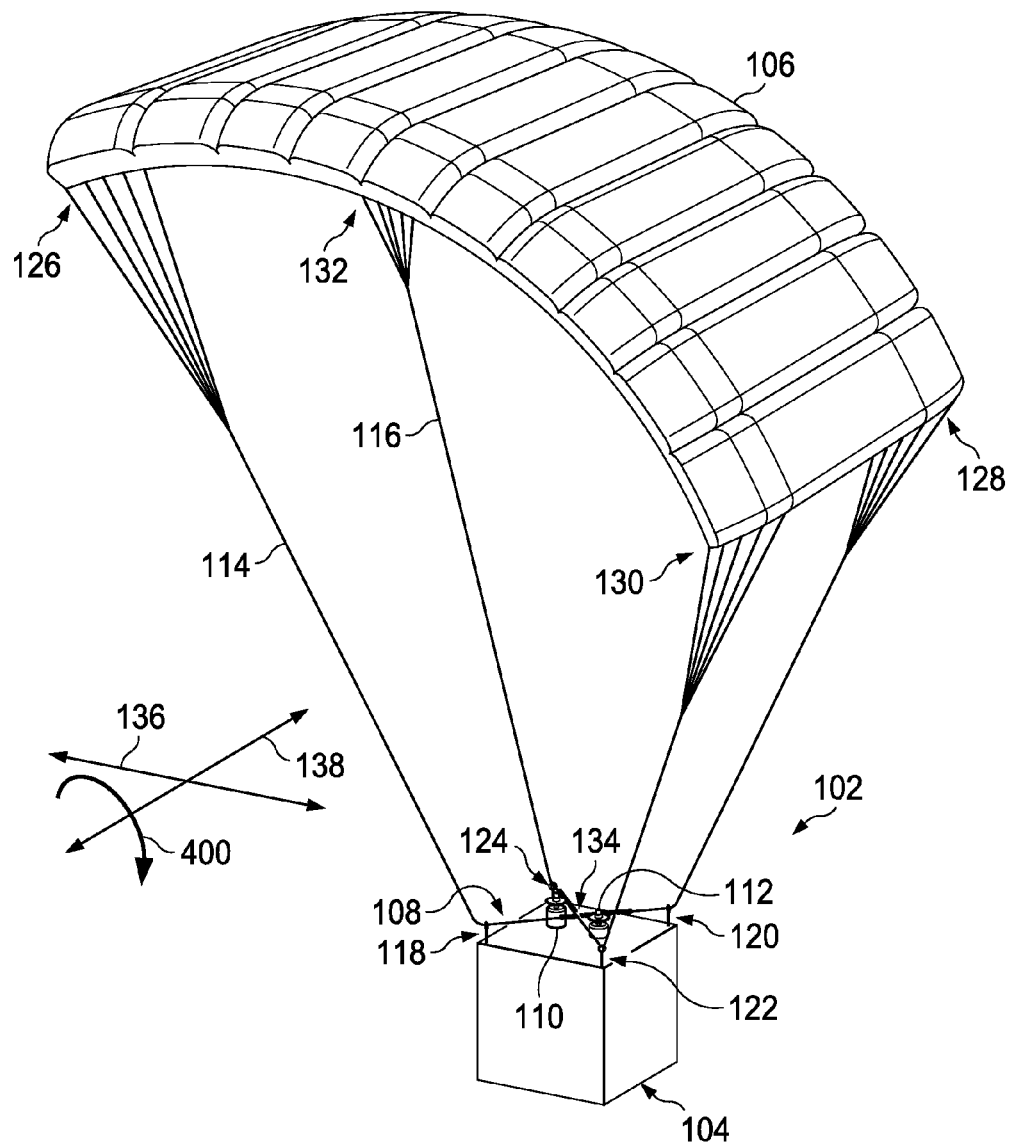
FIG. 4 is an illustration of an air platform in accordance with an advantageous embodiment.

FIG. 4 illustrates another change to the initial flight path 109 of the air platform 102 shown in FIG. 1. As shown in FIG. 4, the position of the payload 104 is changed in a similar manner to that previously described. However, for this embodiment, the payload 104 is moved relative to the lines 114, 116 such that the second and fourth locations of the airfoil 106 are closer to the payload 104 and the first and third locations of the airfoil 106 are further away from the payload 104. The resulting change to the center of mass of the air platform 102 relative to the center of lift for the air platform 102 steers the air platform 102 in the direction of an arrow 400 with respect to the roll axis 138.

Figure 5:
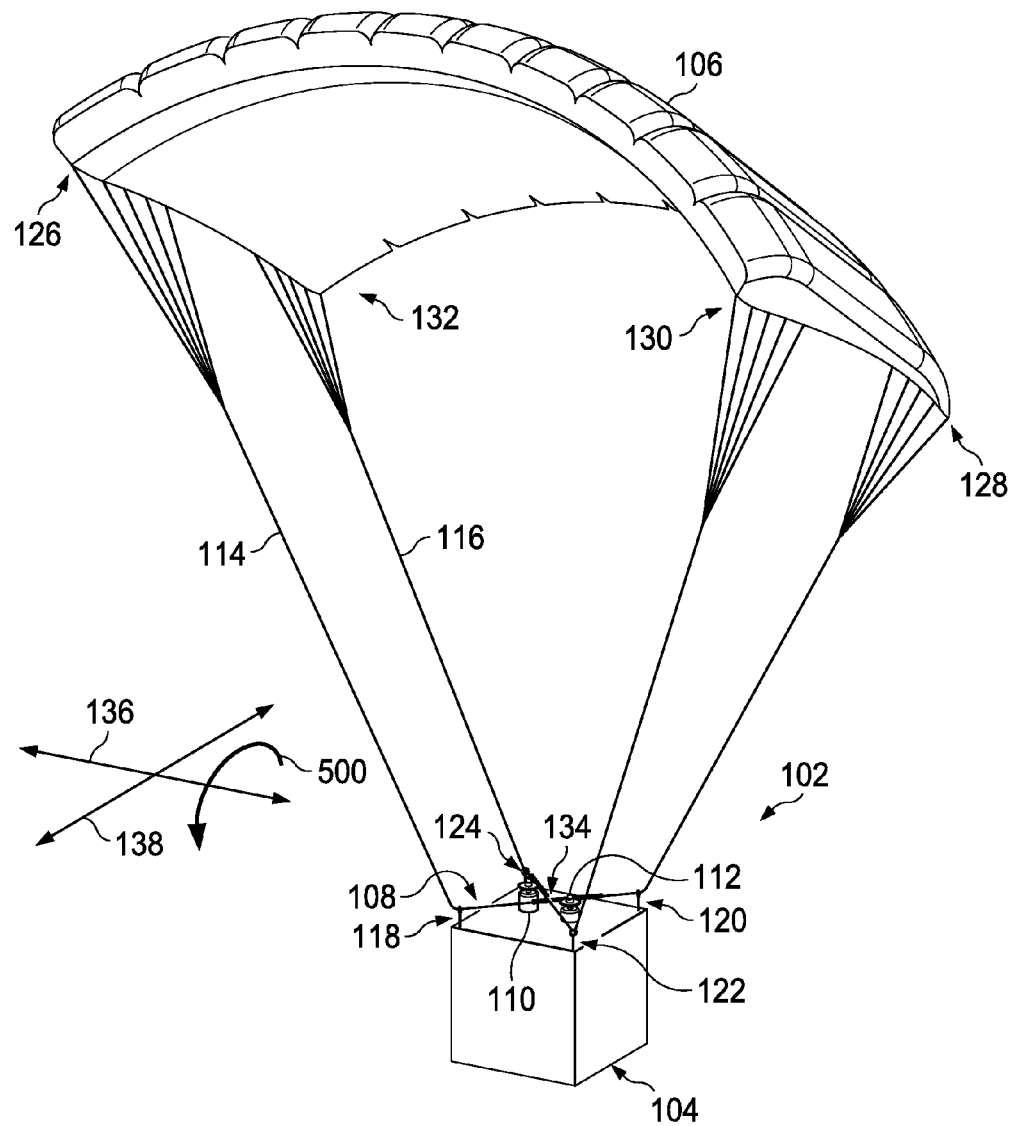
FIG. 5 is an illustration of an air platform in accordance with an advantageous embodiment.

FIG. 5 illustrates yet another change to the initial flight path 109 of the air platform 102 shown in FIG. 1. As depicted in FIG. 5, the position of the payload 104 is moved relative to the lines 114, 116 such that the third and fourth locations of the airfoil 106 are closer to the payload 104, and the first and second locations of the airfoil 106 are further away from the payload 104. The resulting change to the center of mass for the air platform 102 relative to the center of lift for the air platform 102 steers the air platform 102 in the direction of an arrow 500 with respect to the pitch axis 136.

Figure 6:
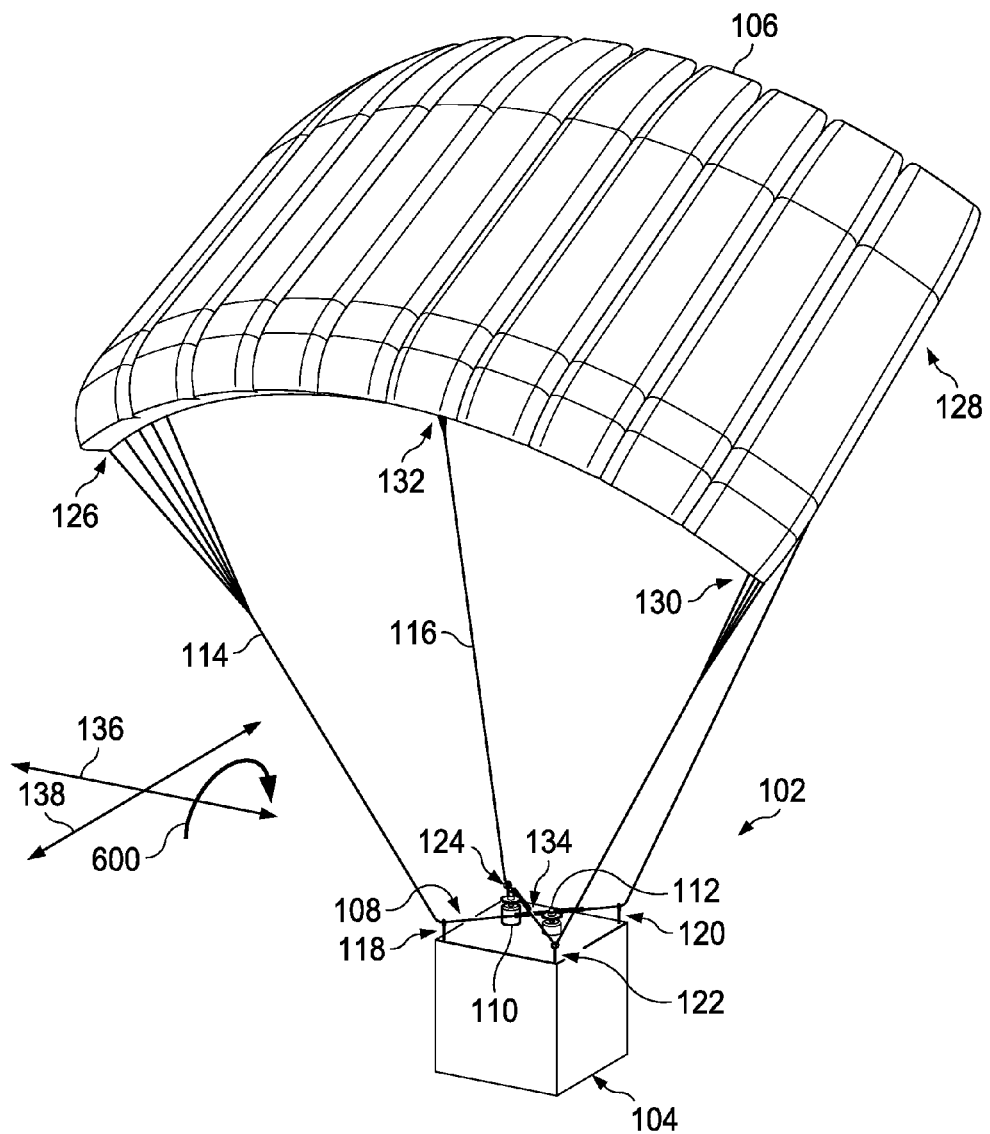
FIG. 6 is an illustration of an air platform in accordance with an advantageous embodiment.

In FIG. 6, another change to the initial flight path 109 of the air platform 102 in FIG. 1 is depicted. The position of the payload 104 is moved relative to the lines 114, 116 such that the first and second locations are closer to the payload 104, and the third and fourth locations are further away from the payload 104. The resulting change to the center of mass relative to the center of lift for the air platform 102 steers the air platform 102 in the direction of an arrow 600 with respect to the pitch axis 136.

Of course, in other embodiments, the payload 104 may be moved such that the air platform 102 is steered with respect to both the pitch axis 136 and the roll axis 138.

In the different advantageous embodiments, different types of movement mechanisms may be used to move the payload 104 with respect to the airfoil 106. For example, in some illustrative examples, the movement mechanism 108 may include one or more pulleys connected to the payload 104. The lines 114, 116 may be configured to pass through grooves in the pulleys. Further, the motors 110, 112 also connected to the payload 104 may be configured to turn wheels that move the payload 104 with respect to the lines 114, 116.

In other illustrative examples, the movement mechanism 108 may include a track system connected to the payload 104. For example, the lines 114, 116 may have chains with teeth that are configured to engage one or more tracks connected to the payload 104. The motors 110, 112 may be configured to move the track to move the payload 104 relative to the lines 114, 116.

Figure 7:
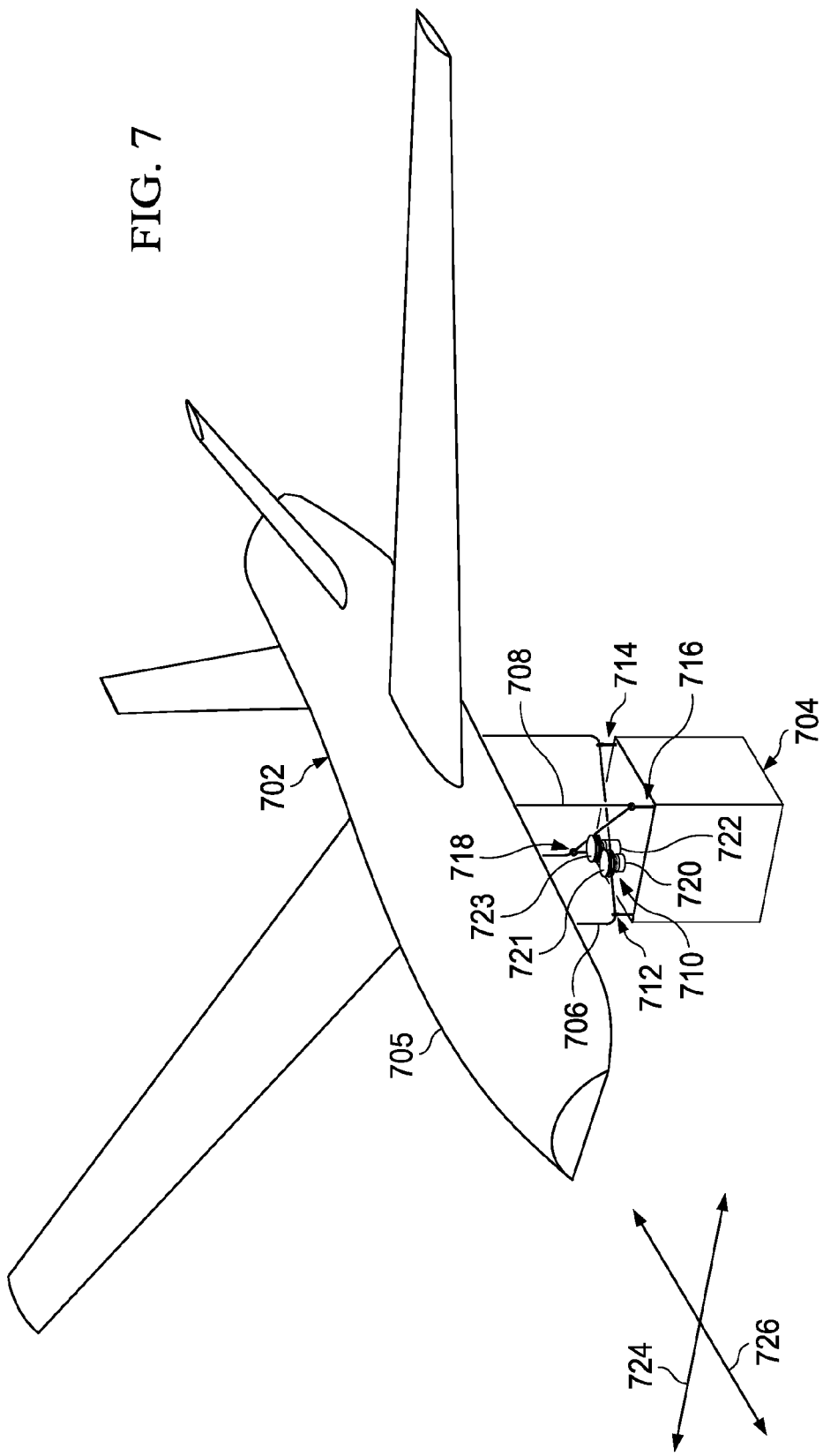
FIG. 7 is an illustration of a fixed-wing vehicle carrying a payload in accordance with an advantageous embodiment.

Referring now to FIG. 7, a different type of air platform configured to carry a payload is depicted. As shown in FIG. 7, a fixed-wing vehicle 702 is shown carrying a payload 704. The payload 704 is located outside of a fuselage 705 of the fixed-wing vehicle 702. In particular, the payload 704 is connected to the exterior of the fuselage 705 of the fixed-wing vehicle 702 by lines 706, 708. The lines 706, 708 are connected to the payload 704 by members 712, 714, 716, 718. In this embodiment, the members 712, 714, 716, 718 are eyelet screws connected to the payload 704 through which the lines 706, 708 are threaded.

A movement mechanism 710 for the fixed-wing vehicle 702 has a configuration similar to the movement mechanism 108 for the air platform 102 in FIG. 1. The movement mechanism 710 for the fixed-wing vehicle 702 includes motors 720, 722 connected to the payload 704. The motors 720, 722 are configured to turn gears 721, 723 to move the payload 704 relative to the lines 706, 708 and thus the fixed-wing vehicle 702. Movement of the payload 704 results in a change in the center of mass for the fixed-wing vehicle 702 relative to the center of lift for the fixed-wing vehicle 702. A change in the center of mass relative to the center of lift causes a change in the flight path for the fixed-wing vehicle 702 with respect to a pitch axis 724 and/or a roll axis 726 for the fixed-wing vehicle 702.

Figure 8:
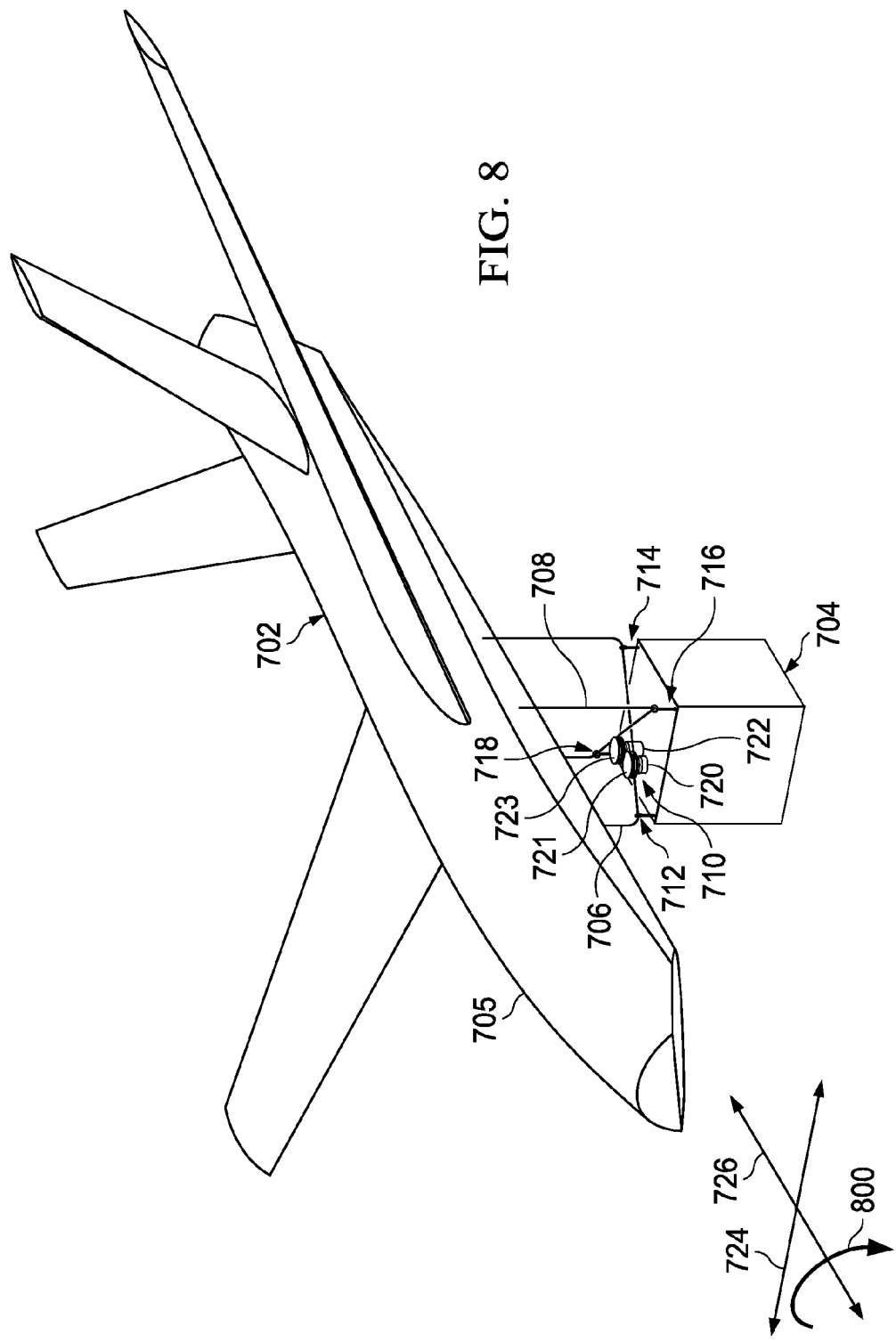
FIG. 8 is an illustration of a fixed-wing vehicle carrying a payload in accordance with an advantageous embodiment.

The following examples illustrate how the fixed-wing vehicle 702 may be steered by changing the center of mass relative to the center of lift for the fixed-wing vehicle 702. As depicted in FIG. 8, the motors 720, 722 turn the gears 721, 723 to move the payload 704 relative to the lines 706, 708. This movement of the payload 704 causes the starboard side of the fixed-wing vehicle 702 to be closer to the payload 704, while the port side is further away from the payload 704. The resulting change in the center of mass for the fixed-wing vehicle 702 relative to the center of lift for the fixed-wing vehicle 702 steers the fixed-wing vehicle 702 in the direction of an arrow 800 with respect to the roll axis 726.

Figure 9:
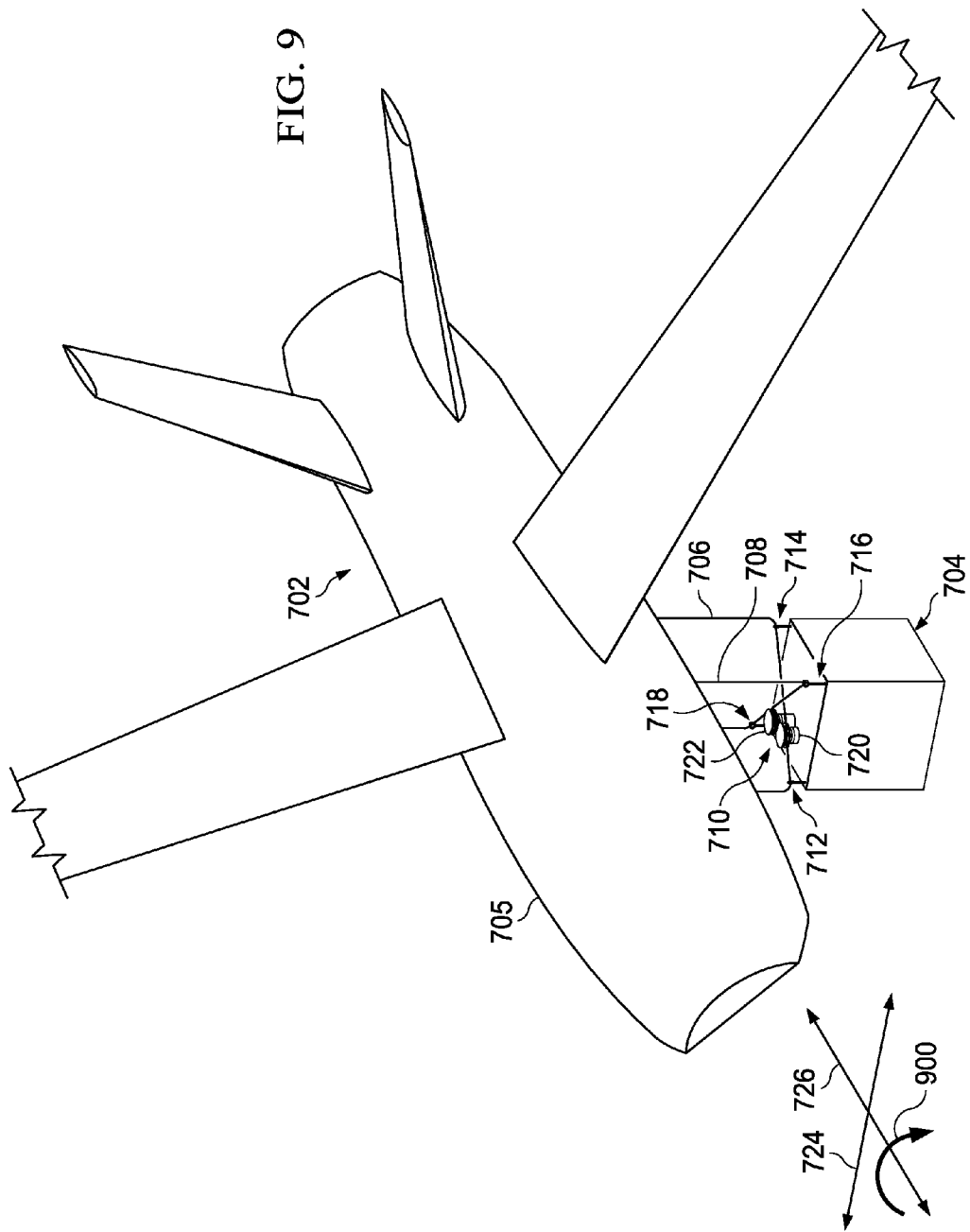
FIG. 9 is an illustration of a fixed-wing vehicle carrying a payload in accordance with an advantageous embodiment.

FIG. 9 illustrates another example of how the fixed-wing vehicle 702 may be steered in a different direction. As shown in FIG. 9, the payload 704 is moved such that the port side of the fixed-wing vehicle 702 is closer to the payload 704, and the starboard side is further away from the payload 704. The resulting change in the center of mass relative to the center of lift for the fixed-wing vehicle 702 steers the fixed-wing vehicle 702 in the direction of an arrow 900 with respect to the roll axis 726.

Figure 10:
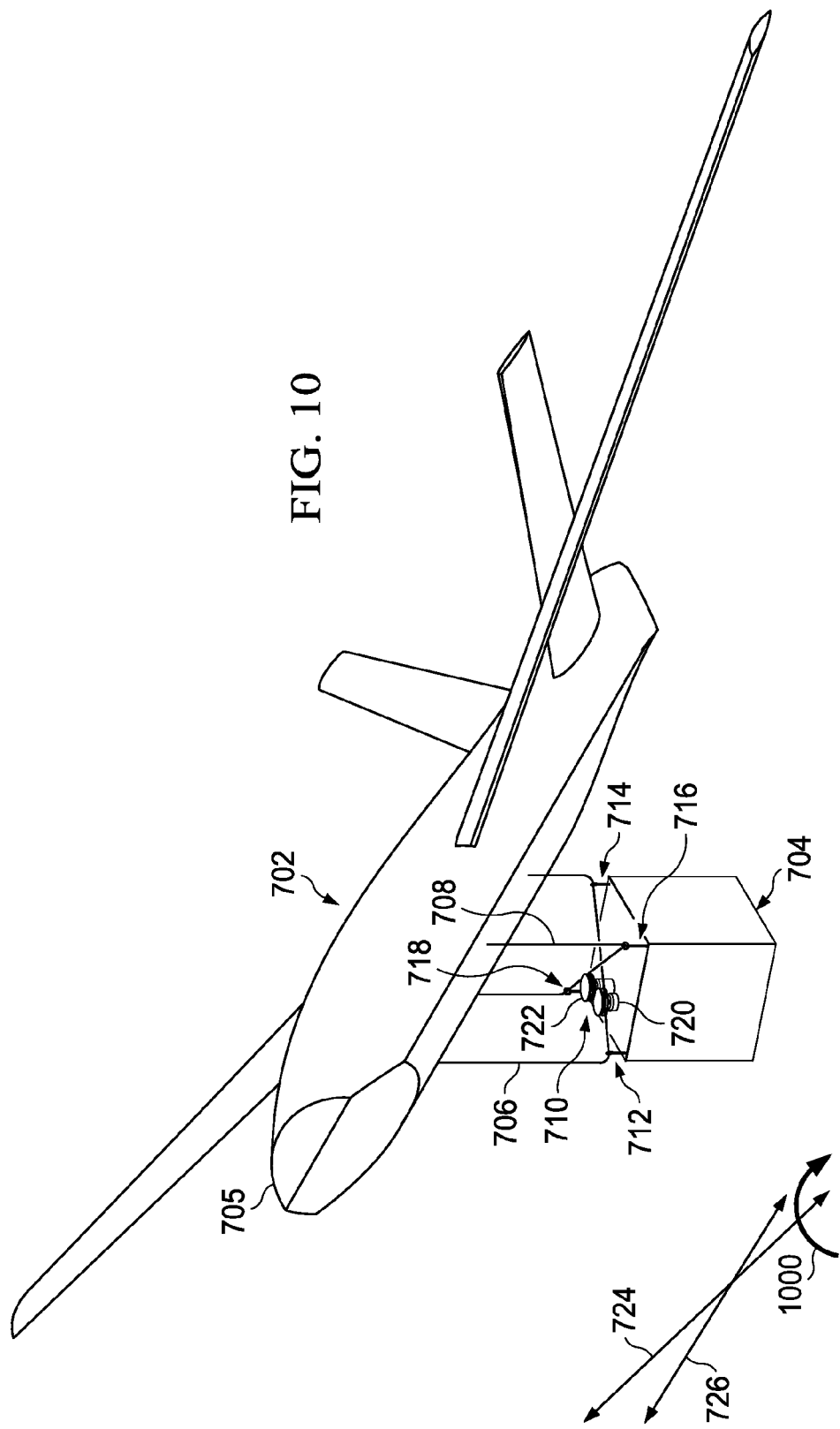
FIG. 10 is an illustration of a fixed-wing vehicle carrying a payload in accordance with an advantageous embodiment.

Turning now to FIG. 10, the payload 704 is moved such that the aft end of the fixed-wing vehicle 702 is closer to the payload 704, while the forward end is further away from the payload 704. The resulting change in the center of mass relative to the center of lift for the fixed-wing vehicle 702 steers the fixed-wing vehicle 702 in the direction of an arrow 1000 with respect to the pitch axis 724.

Figure 11:
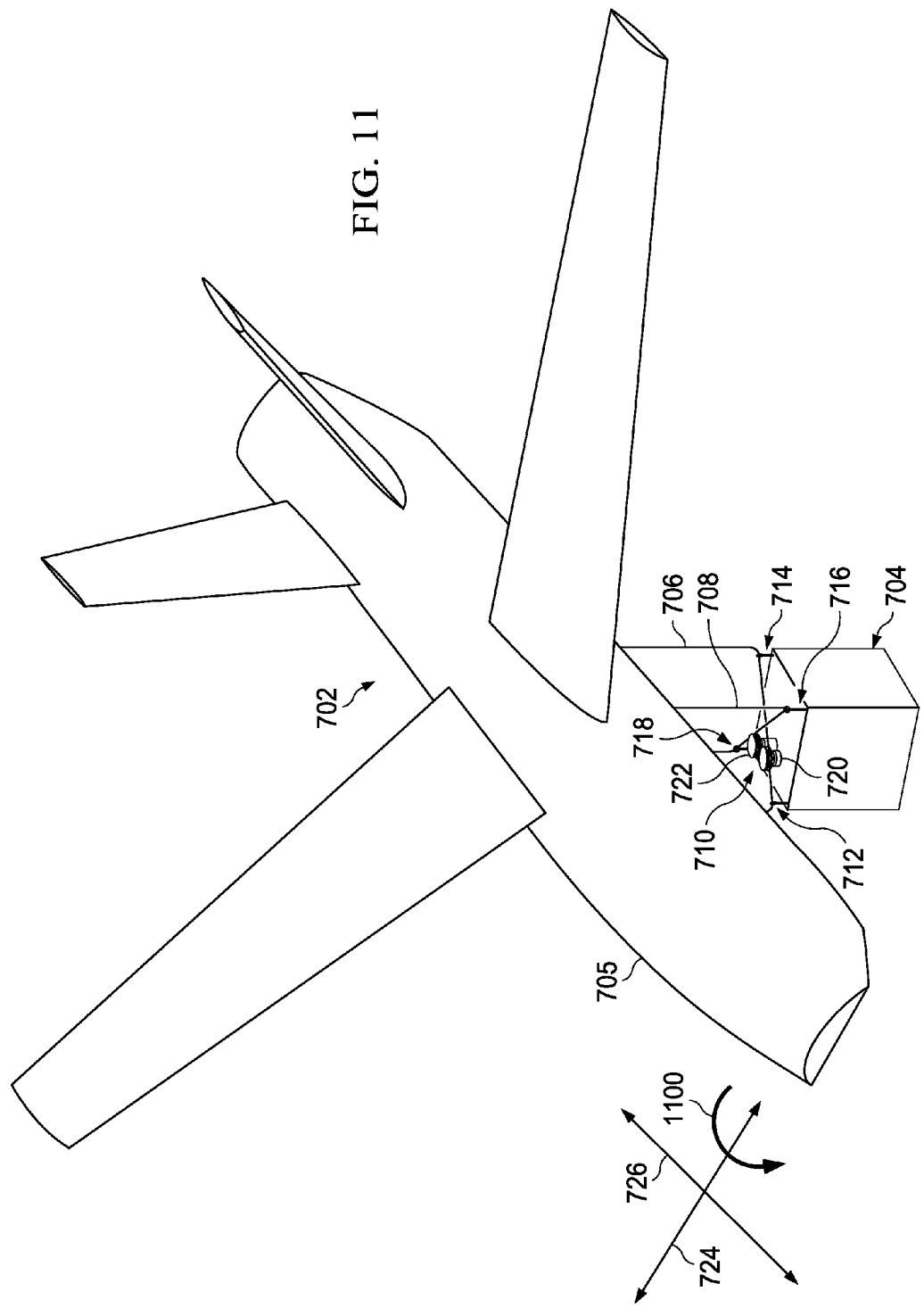
FIG. 11 is an illustration of a fixed-wing vehicle carrying a payload in accordance with an advantageous embodiment.

In FIG. 11, the payload 704 is moved such that the forward end of the fixed-wing vehicle 702 is closer to the payload 704, while the aft end is further away from the payload 704. The resulting change in the center of mass relative to the center of lift for the fixed-wing vehicle 702 steers the fixed-wing vehicle 702 in the direction of an arrow 1100 with respect to the pitch axis 724.

Figure 12:
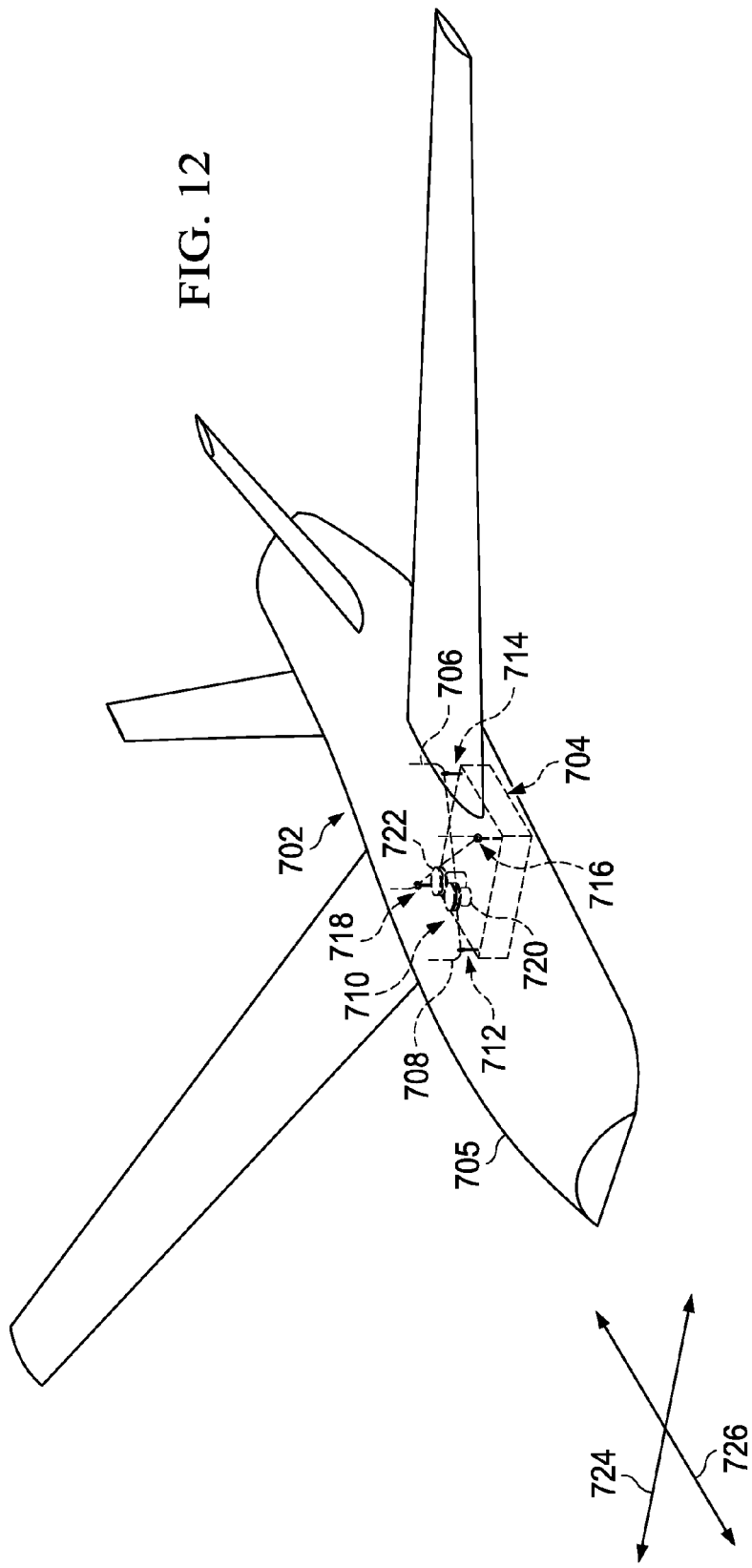
FIG. 12 is an illustration of a fixed-wing vehicle carrying a payload in accordance with an advantageous embodiment.

Referring now to FIG. 12, a different configuration for the fixed-wing vehicle 702 is depicted. In FIG. 12, the payload 704 is shown connected to the interior of the fuselage 705 of the fixed-wing vehicle 702 by the lines 706, 708. In particular, the fixed-wing vehicle 702 is configured to carry the payload 704 inside of the fixed-wing vehicle 702 with the payload 704 connected to the interior of the fixed-wing vehicle 702. Changes to the position of the payload 704 relative to the lines 706, 708 result in changes in the center of mass relative to the center of lift for the fixed-wing vehicle 702. These changes, in turn, cause changes in the flight path for the fixed wing vehicle 702.

Figure 13:
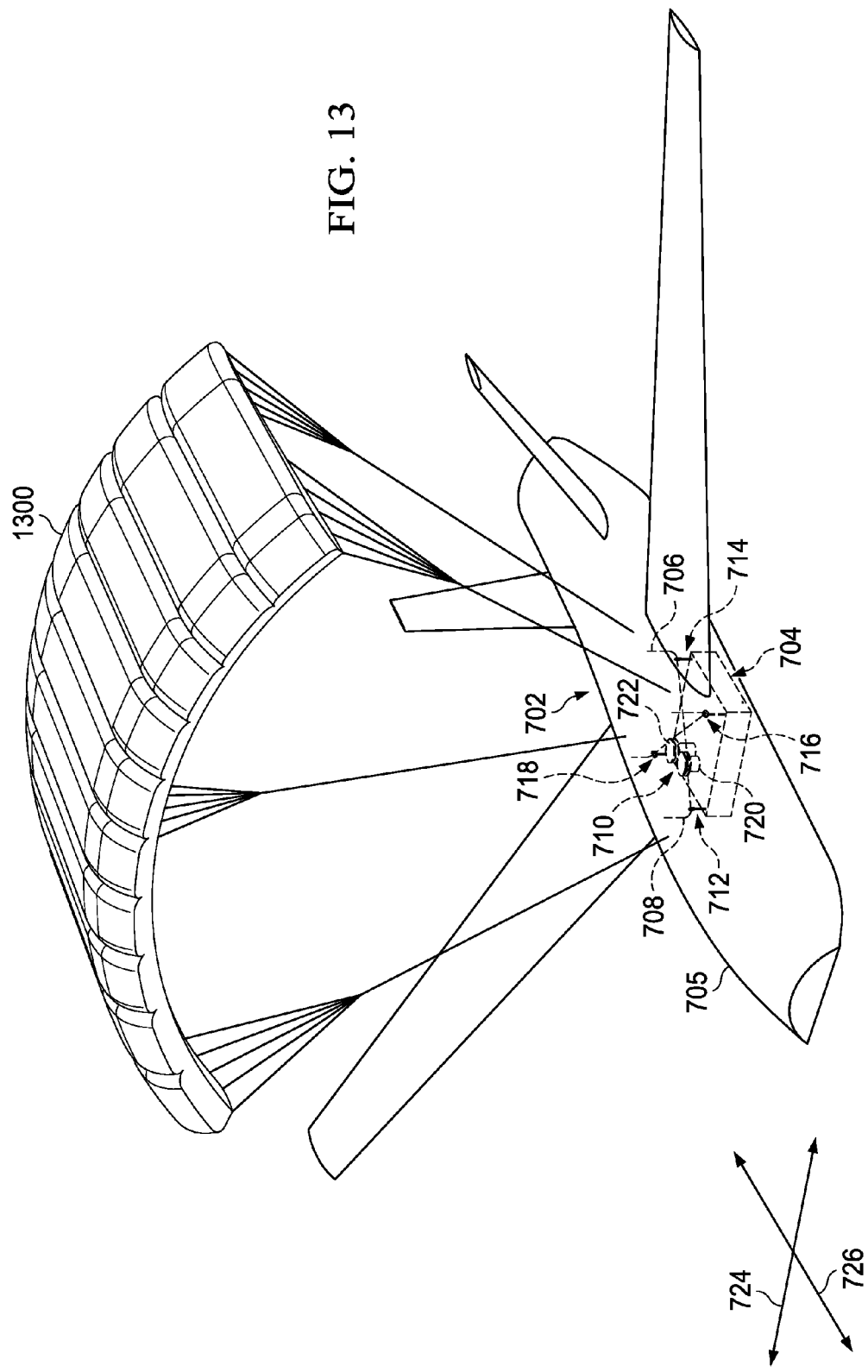
FIG. 13 is an illustration of a fixed-wing vehicle carrying a payload in accordance with an advantageous embodiment.

In FIG. 13, yet another configuration for the fixed-wing vehicle 702 is depicted. In this advantageous embodiment, a parafoil 1300 is attached to the top exterior of the fuselage 705 of the fixed-wing vehicle 702 carrying the payload 704 inside the fixed-wing vehicle 702. The parafoil 1300 may provide additional control of the flight path for the fixed-wing vehicle 702 in addition to the control provided by the movement mechanism 710 and the payload 704.

Figure 14:
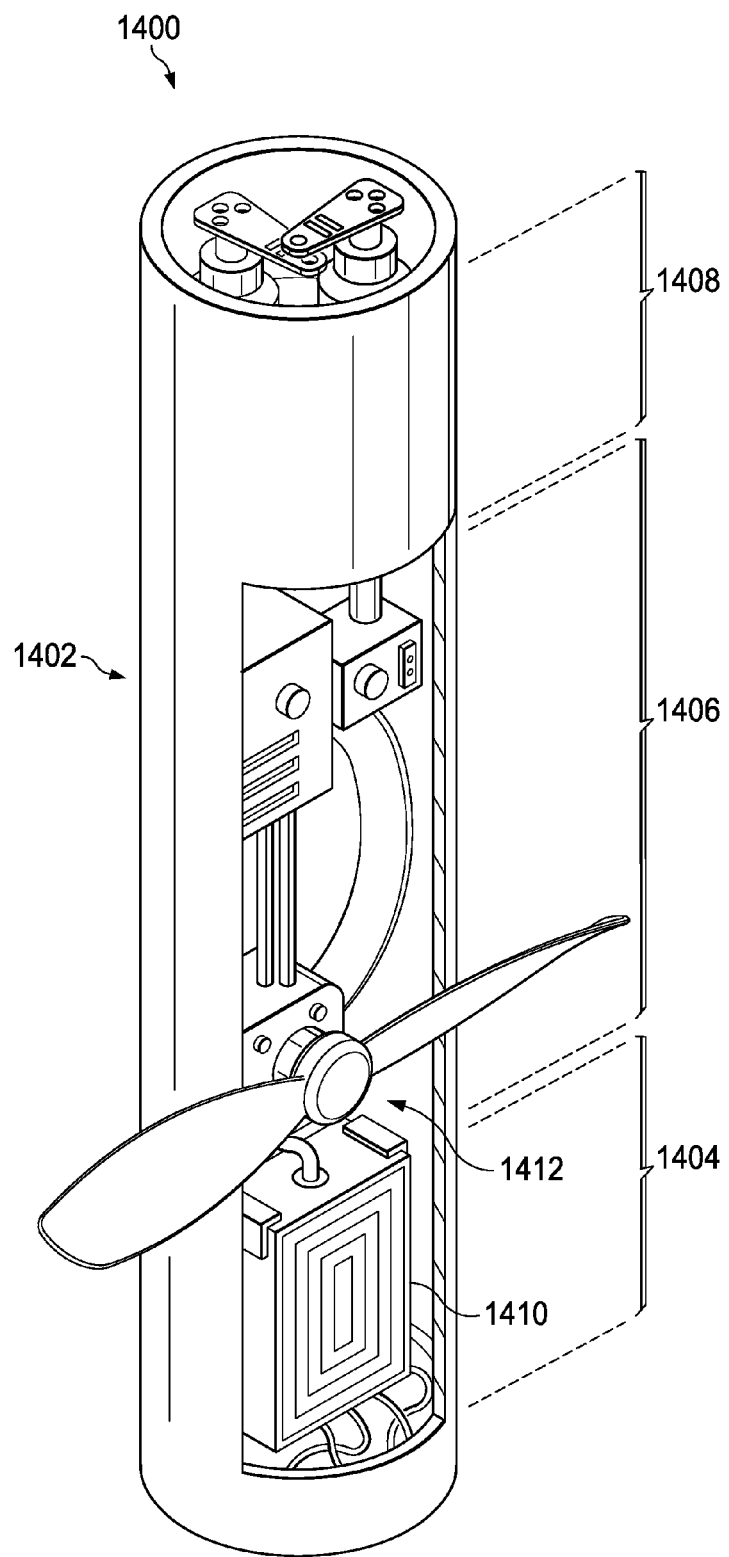
FIG. 14 is an illustration of a partially-exposed view of an air platform in an undeployed state in accordance with an advantageous embodiment.

Referring now to FIG. 14, a partially-exposed view of yet another type of air platform is depicted. In FIG. 14, the air platform is a paraglider 1400. The paraglider 1400 is shown in an undeployed state in this embodiment. The paraglider 1400 is packed in a cylinder 1402. The cylinder 1402 has a first portion 1404, a second portion 1406, and a third portion 1408. The first portion 1404 contains a payload 1410. The second portion 1406 contains a movement mechanism 1412 connected to the payload 1410. The third portion 1408 contains a parafoil (not shown) for the paraglider 1400 in an undeployed state. In other words, the parafoil is stored inside the third portion 1408 of the cylinder 1402.

The cylinder 1402 may be stored in an air vehicle, such as a fixed-wing vehicle, until the cylinder 1402 is ready to be deployed. When deployed from the air vehicle, the parafoil (not shown) for the paraglider 1400 is configured to deploy. In one example, the flight path of the paraglider 1400 may be controlled using the payload 1410 and the movement mechanism 1412 to deliver the payload 1410 to a target location.

Figure 15:
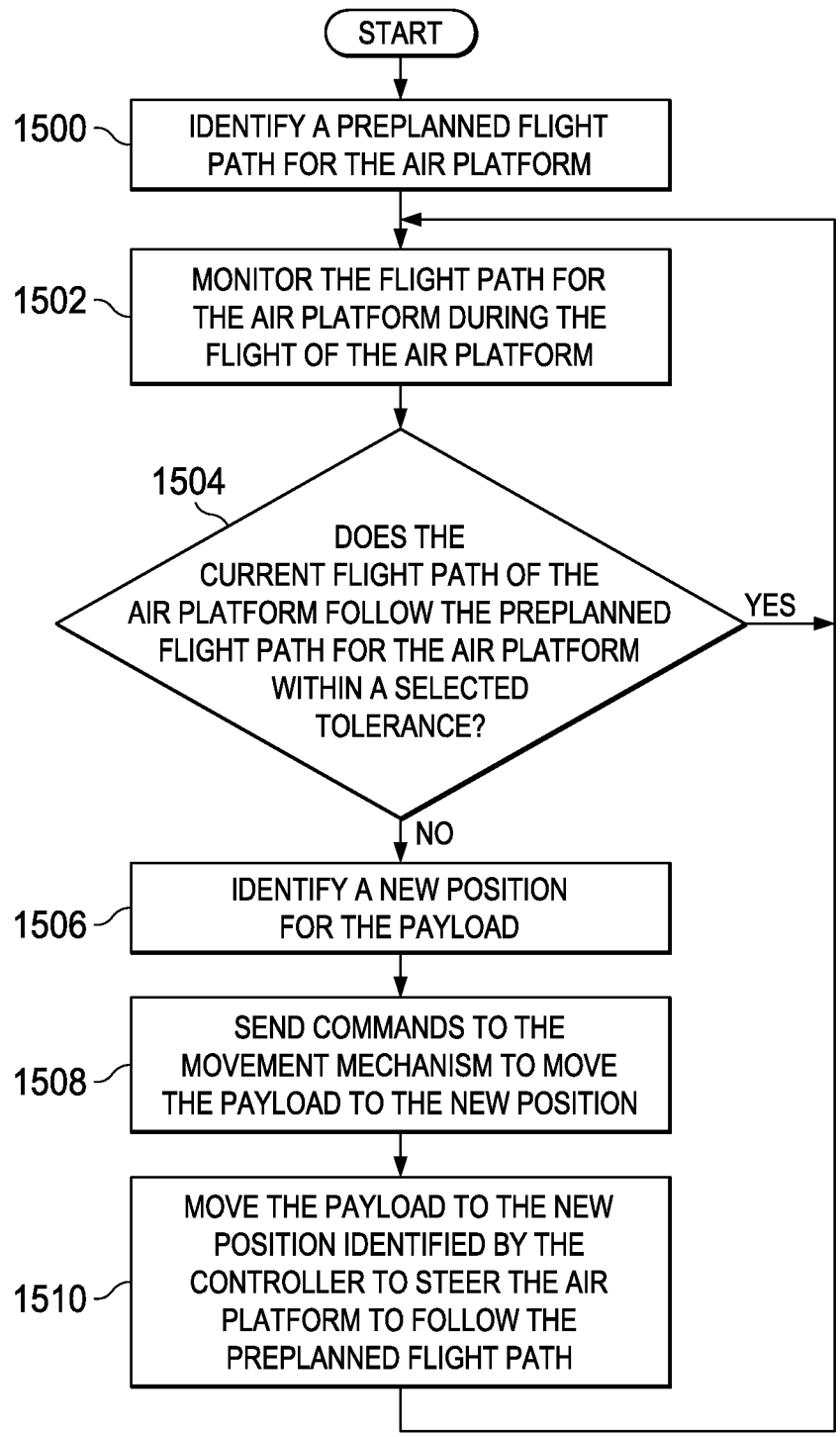
FIG. 15 is an illustration of a flowchart of a process for changing a flight path for an air platform in accordance with an advantageous embodiment.

Turning now to FIG. 15, a flowchart of a process for changing a flight path for an air platform is depicted. The process illustrated in FIG. 15 may be implemented using a weight system and a movement mechanism. The weight system may be a payload, such as the payload 104 for the air platform 102 in FIG. 1. The movement mechanism may be the movement mechanism 108 for the air platform 102 in FIG. 1.

The process begins by identifying a preplanned flight path for the air platform 102 (operation 1500). Operation 1500 may be performed by the controller 208 configured to control the movement mechanism 108. For example, the controller 208 may receive input from a remote operator of the air platform 102 identifying a desired flight path as the preplanned flight path for the air platform 102.

The controller 208 monitors the flight path for the air platform 102 during the flight of the air platform 102 (operation 1502). Operation 1502 may be performed using information provided by a number of sensors on the air platform 102. For example, the controller 208 may make the determination based on location information or position information provided by a global positioning system, an inertial measurement unit, and/or other suitable sensors.

The controller 208 determines whether the current flight path of the air platform 102 follows the preplanned flight path for the air platform 102 within a selected tolerance (operation 1504). If the current flight path of the air platform 102 does not follow the preplanned flight path of the air platform 102 within the selected tolerance, the controller 208 identifies a new position for the payload 104 (operation 1506).

In operation 1506, the new position is identified as a position that will cause the air platform 102 to be steered along the preplanned flight path. The position is a position relative to the airfoil 106 for the air platform 102. More specifically, the position is relative to the lines 114, 116 connecting the payload 104 to the airfoil 106 for the air platform 102.

The controller 208 sends commands to the movement mechanism 108 to move the payload 104 to the new position (operation 1508). The motors 110, 112 move the payload 104 to the new position identified by the controller 208 to steer the air platform 102 to follow the preplanned flight path (operation 1510), with the process then returning to operation 1502 as described above.

In operation 1510, the payload 104 is moved relative to the lines 114, 116 such that the center of mass for the air platform 102 is changed relative to the center of lift for the air platform 102.

With reference again to operation 1504, if the current flight path does follow the preplanned flight path within the selected tolerance, the process proceeds to operation 1502 as described above.

The flowcharts and block diagrams in the different depicted embodiments illustrate the architecture, functionality, and operation of some possible implementations of apparatuses and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for controlling the flight path of an air platform by changing the center of mass of an air platform. The different advantageous embodiments may shift a number of weights for the air platform to change the center of mass of the aircraft.

In one illustrative example, an apparatus comprises a weight system associated with an air platform and a movement mechanism associated with the air platform. The movement mechanism is configured to move the weight system during a flight of the air platform such that a center of mass of the air platform changes in a manner that causes a flight path of the air platform to change.

The weight system and the movement mechanism described in the different advantageous embodiments provide a method and apparatus for controlling the flight path of the air platform without increasing the weight and/or cost of the air platform in an undesirable manner. In the different illustrative examples, the movement mechanism may not be configured to carry a load of the weight system or payload. As a result, in one or more of the different advantageous embodiments, the movement mechanism may be smaller and/or lighter than currently used movement mechanisms that are configured to carry a load.

The different advantageous embodiments recognize and take into account a number of different considerations. For example, the different advantageous embodiments recognize and take into account that some current systems for controlling the flight path of an air platform change the position of a control surface for the air platform or deform and/or distort a portion of a flexible wing for the air platform. For example, with an air platform comprising a wing in the form of a parafoil that is attached to a payload, current systems may control the flight path of the air platform by deforming and/or distorting the parafoil.

Further, the different advantageous embodiments recognize and take into account that one factor in the weight of an air platform using a parafoil is the weight of the electric motors. The electric motors are selected to support the weight of the payload attached to the parafoil. For example, if the payload is a pallet with cargo, the electric motors are attached to the pallet. The lines to the parafoil are then attached to the number of electric motors. Each of the electric motors supports the weight of the pallet with the cargo.

The different advantageous embodiments recognize and take into account that as the size and the weight of the payload increases, the size of the parafoil also increases to support the payload. Further, the increase in these components also involves the use of larger motors. A larger motor is used to generate the force needed to pull the line attached to the wing. As the parafoil increases in size, more force is needed. Further, the motors also support the weight of the payload, because the motors serve as a connection point from the line to the parafoil. Thus, as the size of the payload increases, the load on the motors also increases.

The different advantageous embodiments also recognize and take into account that in some cases, a lever arm may be attached to a motor. This lever arm may move to pull the line attaching the payload to the parafoil. As the size of the parafoil and payload increases, the length of this lever arm may also increase. As a result, the increase in the length of the arm may be undesirable for some flight path control systems for parafoils.

Thus, the different advantageous embodiments provide a method and apparatus for controlling the flight path of an air platform. The control of the flight path is controlled in the illustrative examples by changing the center of mass of an air platform. The different advantageous embodiments may shift a number of weights for the air platform to change the center of mass of the aircraft. As used herein, a number of items means one or more items. For example, a number of weights is one or more weights.

Further, in one advantageous embodiment, an apparatus comprises a weight system and a movement mechanism. The weight system is associated with an air platform. The movement mechanism is configured to move the weight system during flight of the air platform such that a center of mass for the air platform changes in a manner that causes the flight path of the air platform to change.

The description of the different advantageous embodiments has been presented for purposes of illustration and description and is not intended to be exhaustive or limited to the advantageous embodiments in the form disclosed. Many modifications and variations will be apparent to those of ordinary skill in the art. Further, different advantageous embodiments may provide different advantages as compared to other advantageous embodiments. The advantageous embodiment or embodiments selected are chosen and described in order to best explain the principles of the advantageous embodiments, the practical application, and to enable others of ordinary skill in the art to understand the disclosure for various advantageous embodiments with various modifications as are suited to the particular use contemplated.

What is claimed is:

1. A method for changing a flight path of an air platform, the method comprising:
   supporting, a weight system in flight via connecting a first line and a second line to an airfoil and the weight system, such that the air platform comprises the weight system and the airfoil, the first line connecting to the airfoil at a first location and a second location, the first location being opposite and diagonal to the second location on the airfoil, and the second line connecting to the airfoil at a third location and a fourth location, the third location being opposite and diagonal to the fourth location on the airfoil;
   identifying a change for the flight path of the air platform; and
   moving the weight system associated with the air platform during flight of the air platform such that a center of mass of the air platform changes in a manner that causes the flight path of the air platform to change via moving the weight system via moving the line via a motor connected to the weight system, such that the motor avoids supporting a load of the weight system.

2. The method of claim 1, wherein the moving the weight system is performed to change the flight path of the air platform to a desired flight path for the air platform.

3. The method of claim 1, wherein the step of identifying the change for the flight path of the air platform comprises:
   receiving input to change the flight path for the air platform to a desired flight path.

4. The method of claim 3, wherein the step of receiving the input to change the flight path for the air platform to the desired flight path comprises:
   receiving the input from a remote operator of the air platform.

5. A method for changing a flight path of an air platform, the method comprising:
   identifying a change for the flight path of the air platform; and
   moving a weight system associated with the air platform during flight of the air platform such that a center of mass of the air platform changes in a manner that causes the flight path of the air platform to change via moving a line connected to: the weight system and a motor connected to the weight system, via the motor moving the line such that the motor avoids supporting the weight system, such that a first line connects to an airfoil of the air platform at a first location and a second location, the first location being opposite and diagonal to the second location on the airfoil, and a second line connects to the airfoil at a third location and a fourth location, the third location being opposite and diagonal to the fourth location on the airfoil, and the air platform being selected from one of an aircraft, a paraglider, a glider, a fixed-wing vehicle, a parafoil connected to a payload, a hang glider, and a parafoil wing.

6. A method for changing a flight path of an air platform, the air platform comprising:
   an airfoil;
   a weight system;
   members attached to the weight system;
   one or more lines connecting the weight system to the airfoil, wherein the one or more lines are connected to the weight system via the members, the members are configured to allow the lines to pass through the members, and each end of each line of the one or more lines is connected to the airfoil such that a first line of the one or more lines connects to the airfoil at a first location and a second location, the first location being opposite and diagonal to the second location on the airfoil, and a second line of the one or more lines connects to the airfoil at a third location and a fourth location, the third location being opposite and diagonal to the fourth location on the airfoil;
   a motor connected to the weight system and engaging the one or more lines, the motor configured to move a line of the one or more lines while the motor avoids supporting a load of the weight system, and
   the method comprising:
   changing a center of mass of the air platform by moving the weight system relative to the airfoil via moving the line via using the motor and avoiding the motor supporting the load of the weight system.

7. The method of claim 6, wherein moving the weight system relative to the one or more lines moves the weight system relative to the airfoil.

8. The method of claim 7, wherein moving the weight system relative to the airfoil changes the center of mass for the air platform relative to a center of lift for the air platform such that the flight path of the air platform changes with respect to at least one of a pitch axis and a roll axis.

9. The method of claim 6, wherein the members comprise:
   a first member and a second member, the first member and the second member being at opposite and diagonal locations on the weight system; and
   a third member and a fourth member, the third member and the fourth member being at opposite and diagonal locations on the weight system.

10. The method of claim 9, wherein:
    the first line passes through the first member and the second member;
    the second line passes through the third member and the fourth member; and
    the first line and the second line form an X-shape over the weight system.

11. The method of claim 6, further comprising the motor engaging the one or more lines.

12. The method of claim 11, wherein the motors include one or more gears that engage one or more chain sections of the one or more lines.

13. The method of claim 12, wherein moving the weight system relative to the one or more lines comprises rotation of the gears by the motors.

14. The method of claim 6, further comprising one or more pulleys connected to the weight system such that the one or more lines pass through grooves in the pulleys; and
    moving the weight system relative to the one or more lines comprises turning wheels of the pulleys using the motors.

15. The method of claim 6, further comprising a track system connected to the weight system;
    the one or more lines comprising chains comprising teeth engaging one or more tracks of the track system; and
    moving the weight system relative to the one or more lines comprises moving the track using the motors.

16. The method of claim 6, wherein the weight system is a payload for the air platform.

17. The method of claim 6, wherein the members comprise at least one of eyelets, eyelet screws, pulleys, sprockets, gears, or wheels.

18. The method of claim 6, further comprising threading each of the first line and the second line through two members formed as eyelets that are at opposite and diagonal locations on the weight system.

\* \* \* \* \*